United States Patent [19]
Smith

[11] Patent Number: 5,764,796
[45] Date of Patent: Jun. 9, 1998

[54] IMAGE PROCESSING APPARATUS FOR AND A METHOD OF PREPARING DATA REPRESENTING A COLOUR IMAGE

[75] Inventor: Jonathan Price Smith, Basingstoke, England

[73] Assignee: Quantel Limited, Newbury, England

[21] Appl. No.: 826,300

[22] Filed: Mar. 27, 1997

Related U.S. Application Data

[63] Continuation of Ser. No. 262,228, Jun. 20, 1994, abandoned.

[30] Foreign Application Priority Data

Jun. 21, 1993 [GB] United Kingdom ............ 9312759

[51] Int. Cl.$^6$ ........................................ G03F 3/08
[52] U.S. Cl. .................. 382/167; 358/518; 358/504; 358/515
[58] Field of Search .................. 358/501, 504, 358/515, 518, 529; 382/167; G03F 3/08

[56] References Cited

U.S. PATENT DOCUMENTS

| | | | |
|---|---|---|---|
| 4,829,585 | 5/1989 | Shimano | 382/41 |
| 5,012,333 | 4/1991 | Lee et al. | 358/80 |
| 5,032,904 | 7/1991 | Murai et al. | 358/500 |
| 5,155,588 | 10/1992 | Levien | 358/80 |
| 5,185,673 | 2/1993 | Sobol | 358/464 |
| 5,194,966 | 3/1993 | Quardt et al. | 358/406 |
| 5,309,256 | 5/1994 | Takada et al. | 358/504 |
| 5,345,315 | 9/1994 | Shalit | 358/504 |
| 5,347,369 | 9/1994 | Harrington | 358/504 |
| 5,398,121 | 3/1995 | Kowalewski et al. | 358/504 |

Primary Examiner—Thomas L. Stoll
Attorney, Agent, or Firm—Cooper & Dunham LLP

[57] ABSTRACT

An image processing apparatus (1) comprises a color image scanner (2) for producing digital data defining pixels representing an image in terms of cyan (C), magenta (M), yellow (Y) and black (K) components. The CMYK data from the scanner is received by a conversion processor (5) and a color converter (6). The color converter (6) together with a format converter (7) converts the CMYK data into RGB data, representing the image in terms of its red, green and blue components, for processing by a drawing processor (9). The operation of the scanner (2) is adjustable to a desired setting to provide CMYK data to which a color correction has been applied. In order that the RGB data accurately represents the color content of the image the effect of the color correction must be removed. This is achieved by scanning an image of a grey scale with the scanner (2) set to a reference setting and set to the desired setting to obtain two sets of CMYK data which are analyzed by the conversion processor (5) to determine a relationship therebetween. With this information the conversion processor (5) calculates conversion parameters for use by the color converter (6).

19 Claims, 3 Drawing Sheets

IMAGE PROCESSING APPARATUS FOR AND A METHOD OF PREPARING DATA REPRESENTING A COLOUR IMAGE

This is a continuation of application Ser. No. 08/262,228 filed Jun. 20, 1994 now abandoned.

The invention relates to an image processing apparatus for and a method of preparing data representing a colour image.

In electronic image processing systems images are normally defined by data representing an array of picture elements with each picture element being defined in terms of its red, green and blue content. Any three colour components could in fact be used to represent a picture element but red, green and blue are chosen because in electronic image processing systems a television-type monitor is usually provided for display of an image and the colours red, green and blue correspond to the three colour phosphors used in a TV-type monitor. The screen of a monitor is usually dark (black) and during the display of an image the phosphors are stimulated to emit red, green and blue light components which are summed in the eye of a person viewing the monitor and thereby seen as the appropriate colour by the viewer. Thus, the red, green, blue (RGB) colour format is an additive colour format.

Electronic image processing systems are also used to process images prior to printing. Images are usually printed onto white paper and in order to achieve the correct colour when the printed image is viewed inks are used to absorb light which would otherwise reflect from the white paper, thereby leaving only the unabsorbed light to be seen as the appropriate colour by the viewer. In printing, cyan, magenta and yellow inks are used with cyan ink absorbing the colour red, magenta ink absorbing the colour green and yellow ink absorbing the colour blue. The cyan, magenta, yellow (CMY) colour format is a subtractive colour format.

In theory any colour can be reproduced completely using only cyan, magenta and yellow inks. However, in practice there are several limitations in the printing process which will result in cyan, magenta and yellow inks not producing a printed image containing the correct colour. Firstly, the cyan, magenta and yellow inks that are available for printing are not perfect absorbers of red, green and blue light respectively. As a result darker areas of the image will not tend to be seen as black (all colours absorbed) but will instead tend to be seen as a dark purple or brown colour. Secondly, in dark areas relatively large amounts of all three inks should be used to create the dark colour, but laying large amounts of different coloured inks onto a single area of paper often results in the ink smearing and can result in a greater amount of ink being applied to the paper than the paper has the capability to absorb. Thirdly, thick deposits of ink are hard to dry on high speed presses. Fourthly, the cost of ink is significant and using large quantities of ink to represent a single colour increases the cost of printing.

One way in which the problem of printing darker areas in an image can be overcome is to use black as a fourth colour in the printing process. The image separation for black is combined with the black text on a single printing plate thereby enabling image black to be applied to the paper at the same time as the text during printing. There is, however, a problem with this approach in that simple adding black to the printed image will result in an overall darkening of the image and in order to compensate for this darkening the CMY ink separations must be suitably adjusted.

Several different techniques for adjusting the CMY components to account for the extra black (K) component are used in the printing industry. One technique, known as grey component replacement (GCR) involves determining on a pixel-by-pixel basis the black component of the image, and reducing the amount of CMY inks and adding black ink depending on the black component. Another technique, known as under colour removal (UCR), aims to reduce the amount of ink used in printing and is more commonly used than GCR. UCR also relies on replacing the black component of a colour with black ink and reducing CMY ink contributions accordingly. UCR differs from GCR in that the black ink contribution is increased as the total CMY ink density increases so that the total amount of CMYK ink used at a given pixel is less than a predetermined value usually expressed as a percentage, e.g. 340% ink. Other techniques including achromatic colour correction and PCR are also used.

Image scanners are used to scan an image carried on a medium such as white paper or transparent film, and to provide digital data defining pixels which together represent the image. Presently available scanners are constructed to operate using the same general principle. A scanner generally comprises a light source for illuminating a captured image, a set of red, green and blue filters, a light sensitive device for scanning the illuminated image, and electronic circuitry for converting red, green and blue (RGB) data derived from the filters by way of the light sensitive device into CMYK data which is output from the scanner for use subsequently in printing the image. During a scanning operation the image is scanned to provide RGB data simultaneously for each pixel. The intensity of the light from the light source can be adjusted by the operator by way of the set of operator controls on the scanner. Similarly, the operation of the electronic converting circuitry can be adjusted by the operator and thus the operator is able to alter characteristics of the image as represented by the CMYK data output from the scanner.

Early scanners were very expensive and each manufacturer had its own design of conversion circuitry for converting RGB data into CMYK data. These early scanners were, and indeed still are, supported by specialist scanner set-up engineers who are experts at setting-up a scanner to operate to customers requirements. The set-up engineers are trained to vary the operation of the conversion circuitry and, if needed, the light source in order to change the way in which image colours are represented by the output CMYK data to the satisfaction of the customer.

Some more recent scanners use an analytical approach to colour conversion using a method of colour calibration based on converting a colour chart and measuring the monochrome representation of each CMYK colour separation with a densitometer or even measuring the colours of the printed image with a colour meter. The measurements make it possible to calculate the scanner settings required to obtain an image having the desired colour characteristics.

Most scanners also have a large array of controls which allow the user to make adjustments to the colour conversion of each scan as necessary. Such adjustments include identifying the brightest and darkest points in the image (known as the highlight and the shadow) in order to define the dynamic range of the image and may include other adjustments which, from experience, the user knows will result in a "better" picture. The interpretation of a "better" picture is extremely subjective and depends on many parameters that cannot be expressed mathematically. For example, a warm picture may be required, in which case an enhanced yellow content may be appropriate, or maybe the printing press produces a particularly dirty magenta requiring less black to be used. For whatever reason it is the user who makes a value judgement as to how to adjust the colour conversion to obtain the best picture.

In the situation where the CMYK data is output directly from the scanner for printing of the image it is of no concern whether or not the CMYK data has been adjusted before being output from the scanner. However, if the scanned image data is to be processed by an electronic image processing system prior to printing it is necessary to know how the CMYK data was produced by the scanner.

Whilst it is relatively straightforward to convert CMYK data to RGB data when the relationship between the CMYK and RGB data is known, it is not possible to convert between the two colour formats when the relationship is not clearly defined. When a scanner is supplied to a customer the supplier sets up the scanner to the customer's requirements. The scanner set up will be based on parameters established empirically by the supplier during the installation of the scanner. These parameters are not made available to the customer and indeed in many cases are unknown other than as switch positions by the supplier and/or installer. Therefore, the manner in which data is derived for UCR and GCR scans, for example, makes it impossible to reverse convert the CMYK data to RGB data, or even CMY data, with full confidence. For example, in a conversion where an equal amount of black is applied to each pixel there may be many possible different combinations of CMY that would produce the same colour as that defined by the CMYK data. Further uncertainty is introduced when an operator makes additional adjustments to the operator controls on the scanner to achieve what he perceives to be the "best" picture.

Therefore, simply converting the CMYK data from the scanner to RGB data for processing on the basis of an arbitrary transformation will result in RGB data that does not accurately reflect the colour content of the image. By the time the RGB data has been processed electronically and reconverted, the CMYK data may define an image with a colour content significantly different to that of the original image.

The present invention resides in the realisation that, since the conversion to CMYK data by the scanner is based on the black content of the scanned image, the black content can be determined by analysing CMYK data representing an image of a grey scale with the scanner set to a reference setting and with the scanner set to a desired setting. Once the black content of the image has been determined the CMYK data can be converted to CMY data which is a good representation of the colour content of the original image.

According to one aspect of the invention there is provided a method of preparing data representing a colour image from a colour image scanner having adjustable scanning characteristics, the method comprising: scanning an image of a monochrome scale comprising multiple different monochrome values with the scanning characteristics adjusted to a reference setting to obtain first colour separation data representative of the scale; scanning the image of the monochrome scale with the scanning characteristics adjusted to a desired setting to obtain second colour separation data representative of the scale; determining a relationship between the first colour separation data and the second colour separation data for the different monochrome values in the scale; scanning the colour image with the scanning characteristics adjusted to the desired setting to obtain first image colour separation data representing a first set of colour separations which together form the colour image; adjusting the first image colour separation data depending on the determined relationship to produce second image colour separation data representing a second set of colour separations which together form the colour image, the second image colour separation data being in or directly convertable to a form suitable for processing by an electronic image processing system.

According to another aspect of the invention there is provided an image processing apparatus comprising: a colour image scanner having adjustable scanning characteristics for providing colour separation data representing a scanned image; a conversion processor for receiving first colour separation data representing an image of a monochrome scale comprising multiple different monochrome values with the scanning characteristics of the scanner adjusted to a reference setting and second colour separation data representing the image of the monochrome scale with the scanning characteristics adjusted to a desired setting, the conversion processor being adapted to determine a relationship between the first colour separation data and the second colour separation data for the different monochrome values in the scale; a colour converter for receiving from the image scanner with the scanning characteristics adjusted to the desired setting first image colour separation data representing a first set of colour separations which together form a colour image and for converting the first image colour separation data into second image colour separation data representing a second set of colour separations which together form the colour image depending on the relationship determined by the conversion processor; and a store for storing the second image colour separation data.

The above and further features of the invention are set forth with particularity in the appended claims and together with advantages thereof will become clearer from consideration of the following detailed description of an exemplary embodiment of the invention given with reference to the accompanying drawings.

Figure 1:
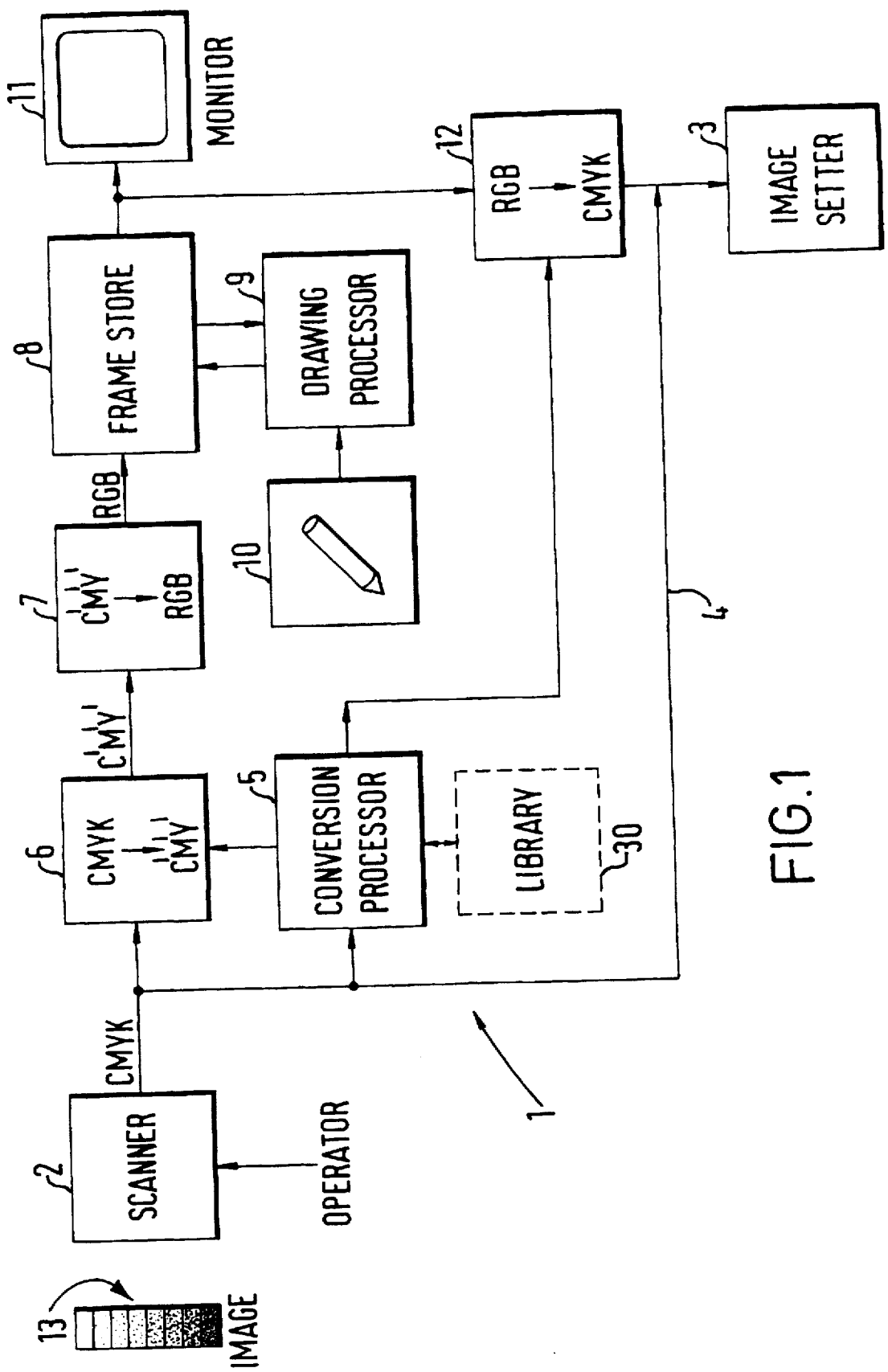
FIG. 1 is a schematic functional block diagram of an image processing system embodying the invention.

Referring now to FIG. 1 of the accompanying drawings an image processing system 1 comprises a colour image scanner 2 for converting a captured image into digital data defining a multiplicity of picture elements (pixels) which together represent the image. The data for each pixel defines the pixel in terms of its cyan (C), magenta (M), yellow (Y) and black (K) components. Thus, for the whole of the image each CMYK colour component corresponds to a colour separation suitable for use in printing the image. The scanner 2 may be any one of a wide range of presently available scanners, for example a Dinippon 608, which include a set of operator controls to enable an operator to adjust the operation of the scanner.

Often, once the image has been scanned to produce CMYK data no further processing of the image is required prior to printing the image. To this end the system 1 comprises an image setter 3 connected to receive CMYK data from the scanner 1 via a data path represented by line 4 in FIG. 1. The image setter 3 is arranged to produce a monochrome film for each of the cyan, magenta, yellow and black separations of the image as represented by the CMYK data from the scanner 1. The separation films produced by the image setter 3 are taken away for use in printing the image. It will be appreciated that the image setter 3 may be replaced by any required image output device or indeed by a store for storing the CMYK data produced by the scanner.

It is sometimes necessary to process the image further before it is output from the system 1. For example the scanned image may include blemishes or indeed unwanted subject matter (such as a competitor's logo on an advertising hoarding, for example) which are best removed in an electronic processing environment. However, whilst images for printing are traditionally represented by data defining the CMYK colour components, images in an electronic environment are traditionally represented by data defining the RGB colour components. The system 1 therefore further comprises a conversion processor 5 and a colour converter 6 both connected to receive the CMYK data from the scanner 1. As will be explained in greater detail hereinafter, the conversion processor 5 is arranged to determine from data from two different scans of a grey scale image 13 the manner in which the scanner 2 derives the black (K) separation from the other (CMY) separations of the image. Thus, the conversion processor 5 determines the relationship between the CMYK data from the scanner and the colour content of the image in terms of CMY components. This information is then used by the conversion processor 5 to determine conversion parameters for use by the colour converter 6 in converting CMYK data representing a colour image scanned by the scanner at a desired image setting into corresponding adjusted C'M'Y' data. The C'M'Y' data output from the colour converter 6 represents more accurately the colour content of the image.

The C'M'Y' data from the colour converter 6 is input to a format converter 7 which converts the data from the C'M'Y' format to an RGB format suitable for further electronic processing. The format converter may be similar to the conversion matrix described in commonly owned European patent application published as EP-A-245943 and corresponding U.S. Pat. No. 4,829,455. The RGB data representing the image is stored in a framestore 8 for further processing by a drawing processor 9 under the control of a user manipulable stylus and touch tablet device 10. Data in the framestore 8 is continuously output in video sequence to a monitor 11 for display of the image represented by the data.

The framestore 8, drawing processor 9, stylus/touch tablet 10 and monitor 11 together form an electronic graphic system similar to that disclosed in commonly owned British patent applications published as GB-A-2089625 and GB-A-2113950 and corresponding U.S. Pat. Nos. 4,514,818 and 4,602,286, which are incorporated herein by reference. Thus, in response to operator manipulation of the stylus/touch tablet device 10 the drawing processor 9 reads data from the framestore 8, modifies the data and writes the modified data back to the framestore 8 replacing corresponding data previously stored therein. The modifications which can be performed by the processor 9 include retouching areas of the image to remove blemishes or unwanted subjects, for example, and changing the whole image by applying for example so called "crisping" and "blurring" algorithms to all of the data in the framestore 8. The modifications provided by the drawing processor 9 are in themselves well known to those possessed of the appropriate skills and require no further explanation herein.

Once the image represented by the RGB data in the framestore 8 has been modified to the satisfaction of the operator, the data is output from the framestore 8 to a format converter 12 which, under the control of the conversion processor 5, converts the RGB data in to data in a CMYK format corresponding to that of the data output from the scanner 2. The format converter 12 may be a so-called "colour cube" for example that disclosed in commonly owned British patent application No. 9303834.7 and corresponding U.S. application Ser. No. 201,804 filed Feb. 25, 1994, which are incorporated herein by reference. CMYK data from the format converter 12 is output to the image setter 3 for creation of cyan, yellow, magenta and black separations for subsequent use in printing the image.

Instead of the format converter 12 being under the control of the conversion processor 5 it could be under the control of an independent processor (not shown). The independent processor would apply to the format converter 12 desired correction values which would not necessarily be the same as those that would be applied if the conversion processor were controlling the converter 12.

Before the CMYK data from the scanner 2 can be converted into corresponding C'M'Y' data by the colour converter 6, the conversion processor 5 must determine the conversion parameters to be used by the converter 6. This is done by scanning an image of a monochrome scale 13 which in this example comprises a grey scale, since it is the black component that is to be removed from the CMYK data, but which could be of another colour if a component other than black is to be corrected for. The grey scale image 13 is scanned with the operator determined scanner settings first set to a reference setting and then set to the desired setting. That is to say the grey scale image is first scanned with the operator determined settings set to zero or a quiescent value to determine how the scanner creates for each shade of grey CMYK data representative thereof.

Figure 2:
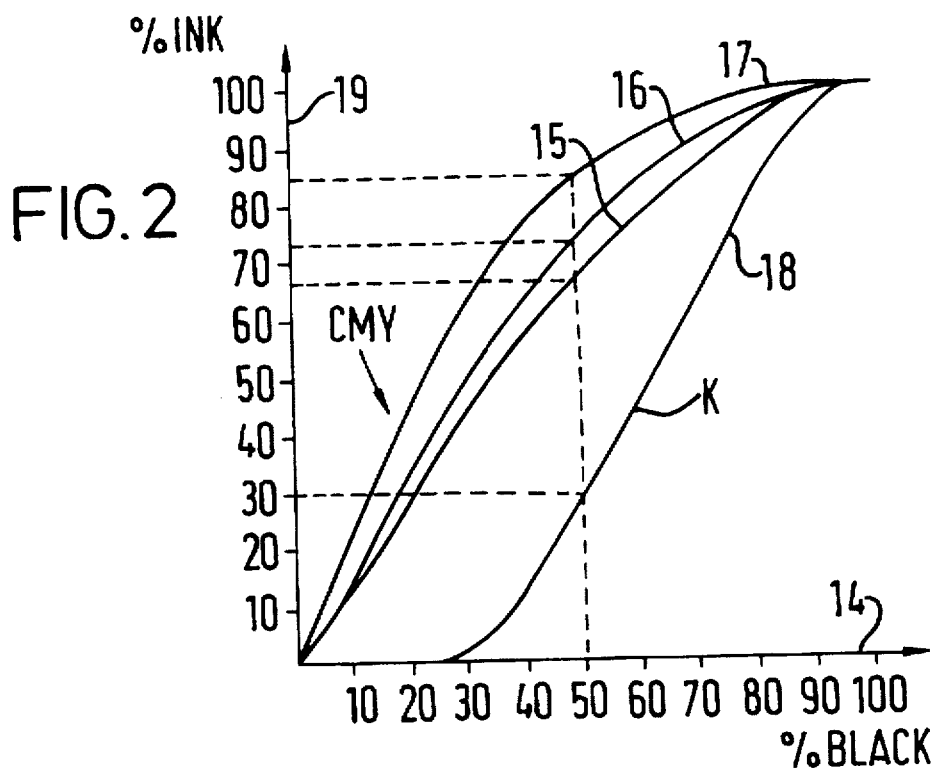
FIG. 2 is a graph depicting colour separation data representing a grey scale from a scanner set to a reference setting.

This first scan is known as a skeletal black scan or a flat scan because it yields data to which no ink related corrections, such as UCR or GCR, and no operator determined adjustments have been made. For this reason skeletal scan CMYK data is suitable for conversion to RGB data. An example of the data obtained by such a scan is shown in graphical form in FIG. 2 of the accompanying drawings. The graph in FIG. 2 shows how in a flat scan the scanner defines shades of grey from 0 to 100% black, as represented by the horizontal axis 14, in terms of cyan, yellow, magenta and black separation values 15 to 18 from 0 to 100%, as represented by the vertical axis 19. It should be noted that the vertical axis represents the percentage of a given colour of ink to be applied to the paper during printing with 100% corresponding to the maximum amount of each ink that can be applied for any one pixel in the image. Thus, for example a grey value of 50% is represented by a black (K) separation value of 30% and cyan, magenta and yellow (CMY) separation values of 66%, 73% and 85%.

Once CMYK separation data has been obtained for grey scale values from 0% to 100% black with the scanner set to the skeletal black settings, the scanner settings are adjusted.

Figure 3:
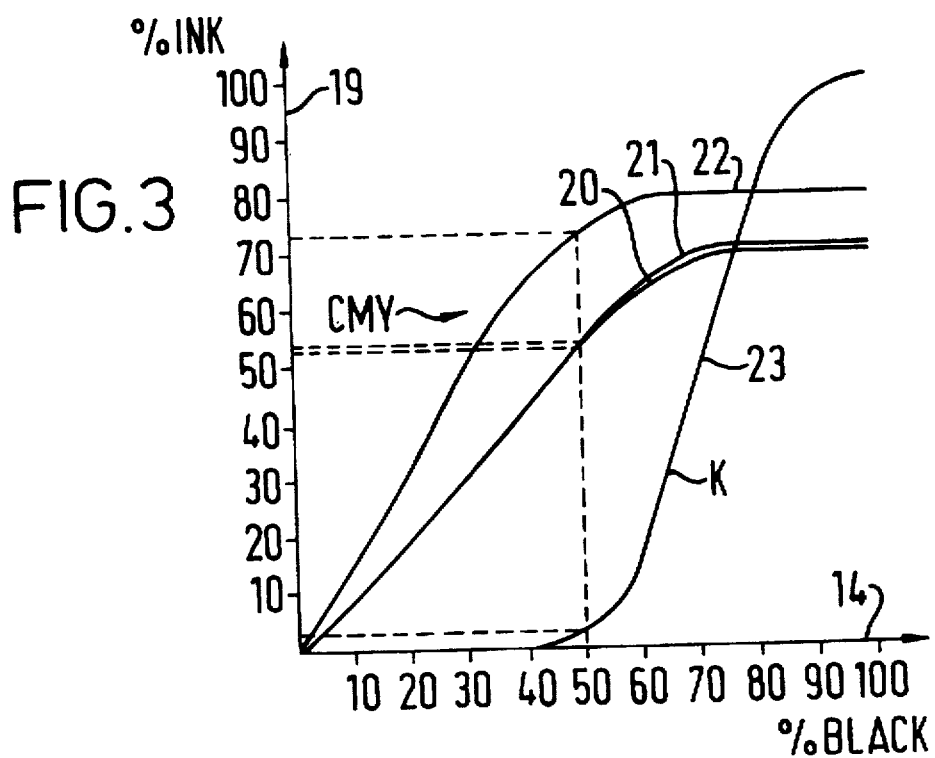
FIG. 3 is a graph depicting colour separation data representing the grey scale from the scanner set to a desired setting.

The scanner is set so that for example UCR or GCR corrections are applied to the data before it is output from the scanner with the settings adjusted by the operator to give the "best" picture. The grey scale image 13 is then scanned again by the scanner 2 to obtain adjusted CMYK data for the grey scale. An example of the adjusted CMYK data obtained with the scanner set to the desired settings for the "best" picture is shown in graphical form in FIG. 3 of the accompanying drawings. The graph in FIG. 3 has horizontal and vertical axes equivalent to those in the FIG. 2 graph, and identified by the same designations 14 and 19, and shows how in a corrected scan the scanner defines the shades of grey in terms of cyan, yellow, magenta and black separation values 20 to 23. Thus, for example, a grey value of 50% is represented by a black (K) separation value of 3% and cyan, magenta and yellow (CMY) separation values of 53%, 54% and 73%. It will be appreciated that the corrected scan CMYK data is not suitable for conversion to RGB data because it contains distortions, introduced by the desired presettings of the scanner controls, in the colour balance of the image. The distortions make for a "better" picture but would be lost if the corrected CMYK data was converted directly to RGB data, processed and then converted back to CMYK data.

During the scannings of the grey scale image the CMYK data and the adjusted CMYK data is output from the scanner 2 to the conversion processor 5 where it is held in a store (not shown). The conversion processor 5 uses the skeletal scan CMYK data and the corrected scan CMYK data to determine the relationship between the corrected CMYK data and the colour in terms of the CMY components in the image represented thereby. The relationship is determined by calculating for each grey scale value the value of the CMY components of the skeletal scan CMYK data minus the corrected scan CMYK data. Thus, in the example shown in FIGS. 2 and 3 for a grey scale value of 50% black the conversion processor 5 would calculate a difference value of: 66−53=13% for cyan; 73−54=19% for magenta; and 85−73=12% for yellow. Whilst in this example all of the difference values are positive there may be situations where some or indeed all of the difference values are negative.

Cyan, magenta and yellow difference values are calculated for every grey value in the grey scale and in this way a relationship between CMYK data and corresponding CMY data is identified by the conversion processor 5. This information is loaded from the processor 5 to the colour converter 6 for use in converting corrected CMYK data representing a scanned colour picture into C'M'Y' data.

Figure 4:
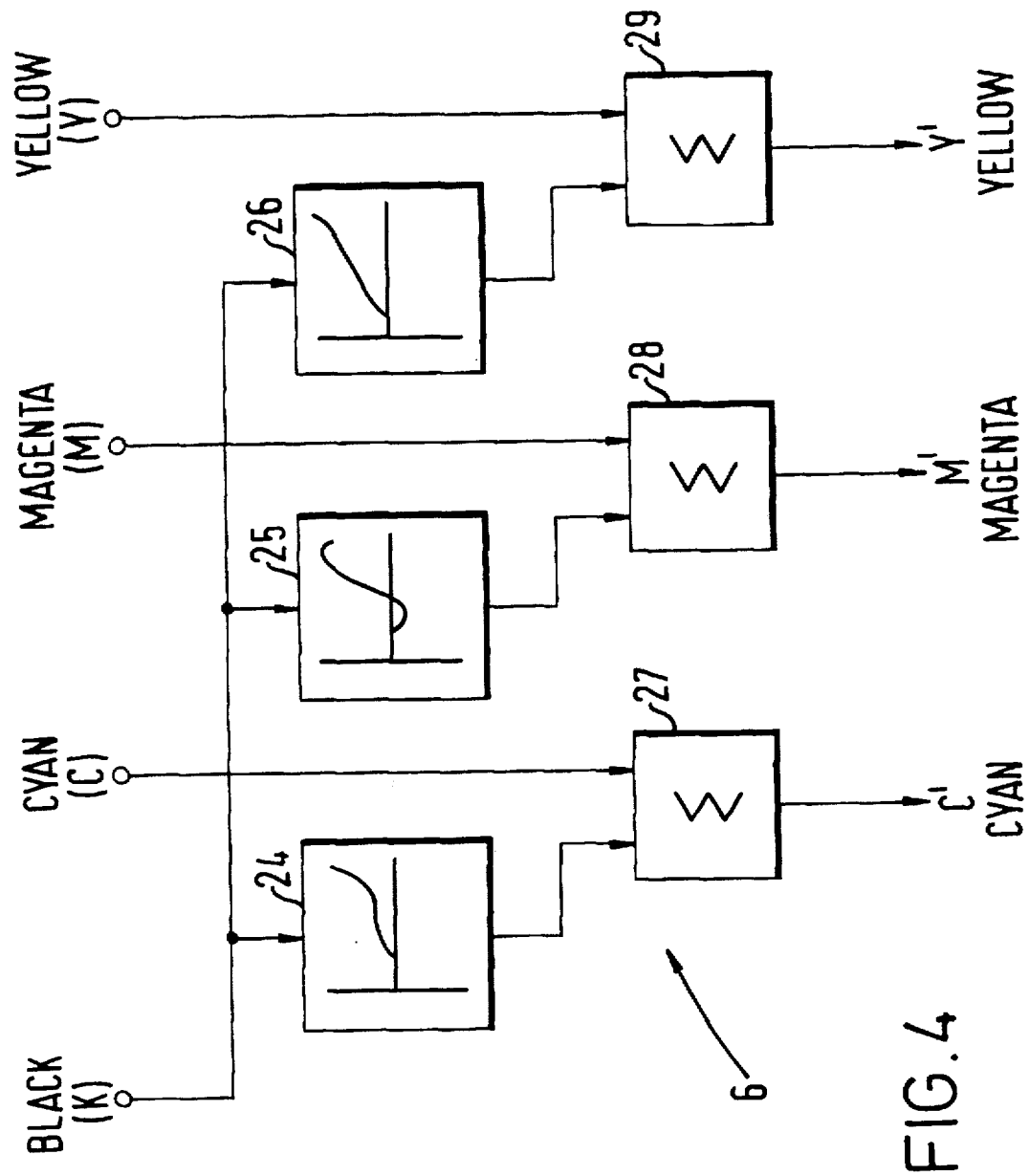
FIG. 4 is a schematic functional block diagram of a conversion circuit used in the system of FIG. 1 to convert CMYK data to CMY data.

The colour converter 6 is shown in greater detail in FIG. 4 of the accompanying drawings and comprises a look up table 24 to 26 and a summer 27 to 29 for each of the cyan (C), magenta (M) and yellow (Y) colour components of the image. The look up tables 24 to 26 are, conveniently, implemented using random access memory (RAM) devices. Each look up table and associated summer operates in a similar manner and therefore, in the following consideration will be given to only the cyan look up table 24 and summer 27. The cyan look up table 24 is loaded with difference value data from the conversion processor 5 corresponding to the difference between the cyan values of the skeletal scan and the cyan values of the corrected scan.

As CMYK picture data representing a colour picture to be processed is output from the scanner 2, the black separation data (K) is input to the cyan look up table 24 which outputs a difference value to the summer 27. At the same time corresponding cyan separation data (C) is input to the summer 27. The difference value from the look up table is added to the cyan value from the scanner by the summer 27 which outputs an adjusted cyan value (C'). Adjusted magenta (M') and yellow (Y') values are derived in a similar manner and output from the summers 28 and 29 respectively. Thus, the converter 6 replaces the black (K) separation in the CMYK data by adjusting the values of the other colour (CMY) separation data to produce C'M'Y' data representing the image. The values are adjusted on the basis of the difference between a corrected scan and a skeletal scan and therefore the C'M'Y' data corresponds to the colour values in the image as if scanned with the scanner set to a skeletal scan setting. The C'M'Y' data can be converted directly to RGB data by the format converter 7 and stored in the framestore 8 for processing by the drawing processor 9.

The conversion processor 5 contains the data necessary to convert the processed RGB data back into corrected CMYK data (i.e. data to which UCR, GCR or other colour corrections have been made) for use in printing the processed image. The conversion from RGB data back into corrected CMYK data is the reverse of the conversion performed by the converters 6 and 7 and is executed by the format converter 12 under the control of the conversion processor 5.

The above described technique successfully converts corrected CMYK data to C'M'Y' data corresponding to a skeletal scan because scanners are designed such that UCR, GCR and other colour corrections are based on the same algorithm used by the scanner to produce the black (K) separation data, with the algorithm adjusting CMY colour values based on the grey component of the colour.

In the foregoing explanation the scanning of the grey scale has been described as an operation entirely separate to the scanning of the colour image. However, by placing the grey scale image next to the colour image before scanning, the grey scale can be scanned at the same time as the image. This has the advantage that the grey scale image and the colour image are scanned with exactly the same scanner set up and any peculiarities in the scanner set up will therefore be compensated for automatically during the conversion by the converter 6. A disadvantage is that the image defined by the CMYK data from the scanner will include the grey scale and this will have to be removed before the CMYK data is output to the image setter 3.

Another alternative would be to provide a library of conversion data. As shown in broken lines in FIG. 2 a library 30 of data can be connected to the conversion processor 5. The library 30 would contain CMYK data representing the grey scale scanned with the scanner set to a skeletal scan setting and sets of CMYK data representing the grey scale scanned with the scanner set to various desired settings used by the operator. The library could be updated by the conversion processor when a new scanner set up is first used. Each set of data in the library 30 would be given an appropriate name to facilitate identification and would be accessed when required by the conversion processor 5 to program the look up tables in the colour converter 6. An advantage of this approach is that it does away with the need to scan the grey scale image each time. Furthermore, using this approach the CMYK data from the scanner does not contain information relating to the grey scale image and this simplifies subsequent processing of the data. However, a disadvantage is that scanning of the grey scale image becomes distanced from the scanning of the colour image and any differences in the scanner set up between the scanning of the grey scale image and the scanning of the colour image will introduce errors. For this reason the use of a library is not preferred.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

I claim:

1. A method of producing data representative of a colour image from a colour image scanner having adjustable scanning characteristics and in an electronically displayable and manually manipulable form, the method comprising:

scanning an image of a monochrome scale comprising multiple different monochrome values with a scanning characteristic adjusted to an uncorrected setting to obtain first colour separation data representative of the scale;

scanning the image of the monochrome scale with the scanning characteristic adjusted to an adjusted setting to obtain second colour separation data representative of the scale;

determining a relationship between the first colour separation data and the second colour separation data for the different monochrome values in the scale;

scanning the colour image with the scanning characteristics adjusted to the adjusted setting to obtain first image colour separation data representing a first set of colour separations which together form the colour image;

adjusting the first image colour separation data depending on the determined relationship to produce second image colour separation data representing a second set of colour separations which together form the colour image, the second image colour separation data being in or directly convertible to a form suitable for processing by an electronic image processing system.

2. A method as claimed in claim 1, comprising employing a grey scale as the monochrome scale.

3. A method as claimed in claim 1, comprising adjusting the uncorrected and adjusted settings of the scanner so that the first and the second colour separation data representative of the scale comprise data representing printing ink colour separations.

4. A method as claimed in claim 1, comprising disposing the uncorrected setting of the scanner so that the first set of colour separations which together form the colour image comprises printing ink colour separations.

5. A method as claimed in claim 4, comprising disposing the uncorrected setting of the scanner so that the first set of colour separations comprises cyan, magenta, yellow, and black colour separations.

6. A method as claimed in claim 1, comprising disposing the adjusted setting of the scanner so that the second set of colour separations comprises cyan, magenta, and yellow colour separations.

7. A method as claimed in claim 1, further comprising processing the second image colour separation data to produce processed separation data representing a processed version of the image; and converting the processed separation data depending on the determined relationship into converted data representing the processed version of the image as separations in said first set of colour separations.

8. An image processing apparatus comprising:

a colour image scanner having adjustable scanning characteristics for providing colour separation data representing a scanned image;

a conversion processor for receiving first colour separation data representing an image of a monochrome scale comprising multiple different monochrome values with a scanning characteristic of the scanner adjusted to an uncorrected setting and second colour separation data representing the image of the monochrome scale with the scanning characteristic adjusted to an adjusted setting, the conversion processor being adapted to determine a relationship between the first colour separation data and the second colour separation data for the different monochrome values in the scale;

a colour converter for receiving from the image scanner with the scanning characteristic adjusted to the adjusted setting first image colour separation data representing a first set of colour separations which together form a colour image, and for converting the first image colour separation data into second image colour separation data representing a second set of colour separations which together form the colour image depending on the relationship determined by the conversion processor; and memory for storing the second image colour separation data.

9. An image processing apparatus as claimed in claim 8, further comprising a first format converter for receiving the second image colour separation data from the colour converter, for converting the same to a format which facilitates further processing thereof and for outputting the converted second colour separation data for storage in the memory.

10. An image processing apparatus as claimed in claim 8, further comprising a drawing processor responsive to a user operable input device for processing the data stored in the memory.

11. An image processing apparatus as claimed in claim 10, wherein the drawing processor is adapted to read selected data from the store in response to user operation of the input device, to modify the read data and to write the thus modified data to the store replacing corresponding data previously stored therein.

12. An image processing apparatus as claimed in claim 10, wherein the drawing processor is adapted to modify substantially all of the data in the store in response to user operation of the input device.

13. An image processing apparatus as claimed in claim 8, further comprising a monitor for displaying the image represented by the data stored in the memory.

14. An image processing apparatus as claimed in claim 8, further comprising a second format converter for converting the data in the store into a format corresponding to that of said second colour separation data depending on the relationship determined by the conversion processor.

15. An image processing apparatus as claimed in claim 14, further comprising an image setter for receiving data from the second format converter and for producing image colour separations for use in printing the image represented by the data from the second format converter.

16. An image processing apparatus as claimed in claim 8, further comprising a data library for storing said first and second colour separation data for the conversion processor.

17. An image processing apparatus as claimed in claim 8, wherein the colour converter comprises a plurality of look up tables defining the relationship between said first colour separation data and said second colour separation data.

18. An image processing apparatus as claimed in claim 17, wherein the first colour separation data comprises data representing cyan, magenta, yellow and black separations, and the second colour separation data comprises data representing cyan, magenta and yellow separations the colour converter comprising a look up table responsive to the black separation data of said first colour separation data for providing for each of the cyan, magenta and yellow separations of said second colour separation data a correction value to be applied to the respective cyan, magenta and yellow separations of said first colour separation data.

19. An image processing apparatus as claimed in claim 18, wherein the colour converter comprises a plurality of summing units connected to a respective one of the plurality of look up tables for summing the correction values to the respective cyan, magenta and yellow separations of said first colour separation data.

* * * * *